US008255297B2

(12) United States Patent
Morgenstern et al.

(10) Patent No.: US 8,255,297 B2
(45) Date of Patent: Aug. 28, 2012

(54) CREATION, REDEMPTION, AND ACCOUNTING IN A VIRTUAL CURRENCY SYSTEM

(75) Inventors: Jared Morgenstern, Palo Alto, CA (US); George Lee, Mountain View, CA (US); Guy Rom, Sunnyvale, CA (US); Daniel Alan Levy, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 161 days.

(21) Appl. No.: 12/839,993

(22) Filed: Jul. 20, 2010

(65) Prior Publication Data

US 2012/0022981 A1 Jan. 26, 2012

(51) Int. Cl.
*G07B 17/00* (2006.01)
*G07F 19/00* (2006.01)
*G06Q 30/00* (2006.01)

(52) U.S. Cl. .......................... 705/30; 705/26
(58) Field of Classification Search ............... 705/30
See application file for complete search history.

(56) References Cited

U.S. PATENT DOCUMENTS

| | | | | |
|---|---|---|---|---|
| 2001/0044774 | A1* | 11/2001 | Sasazawa et al. | 705/39 |
| 2002/0022966 | A1* | 2/2002 | Horgan | 705/1 |
| 2003/0078765 | A1* | 4/2003 | Hoffmaster | 703/22 |
| 2004/0049423 | A1* | 3/2004 | Kawashima et al. | 705/14 |
| 2006/0173761 | A1* | 8/2006 | Costakis | 705/35 |
| 2007/0087756 | A1* | 4/2007 | Hoffberg | 455/450 |
| 2009/0132416 | A1* | 5/2009 | Titus et al. | 705/44 |
| 2009/0265268 | A1* | 10/2009 | Huang et al. | 705/39 |
| 2010/0070377 | A1* | 3/2010 | Williams et al. | 705/26 |

OTHER PUBLICATIONS

By Don Clark. "Virtual Economy—Start-Up's Online Game Will Allow Users to Trade Real Cash for Play Money." Wall Street Journal Jan. 8, 2003, Europe: ProQuest Newsstand, ProQuest. Web. Jun. 12, 2012.*
PCT International Search Report and Written Opinion, PCT Application No. PCT/US2011/035860, Aug. 12, 2011, seven pages.

* cited by examiner

*Primary Examiner* — Matthew S. Gart
*Assistant Examiner* — Seye Iwarere
(74) *Attorney, Agent, or Firm* — Fenwick & West LLP

(57) ABSTRACT

A virtual currency system keeps track of virtual credits, which can be owned, transferred, purchased, and sold by participants in a virtual economy. Each virtual credit has an internal value and an external value, which define, respectively, the exchange rates for creating and redeeming the virtual credits. Upon creation of new virtual credits, the internal value for those credits is the rate for which real currency was paid per credit. The external value sets the rate at which the virtual credits can be redeemed for real currency. Each virtual credit may further have a face value, which is an apparent value of the virtual credit within the virtual economy, giving users a baseline impression for valuing the virtual currency. These features of the virtual currency enable a number of useful actions within the virtual economy, including currency seeding, couponing, and chargebacks.

35 Claims, 7 Drawing Sheets

CREATION, REDEMPTION, AND ACCOUNTING IN A VIRTUAL CURRENCY SYSTEM

BACKGROUND

This invention relates generally to virtual economies, and in particular, to creating, redeeming, and tracking virtual credits by a virtual currency system.

Virtual currency systems enable users to interact in a virtual environment by transacting with other entities in the virtual environment. Users may exchange virtual credits for a variety of different purposes, such as a purchase of goods or services from a vendor or a gift or payment between individuals. In some systems, virtual credits can also be exchanged for real currency, such as by purchasing virtual credits with real currency and/or redeeming virtual credits for real currency. Conventionally, however, all virtual credits are treated the same in virtual currency systems. In particular, virtual credits are created based on an original exchange rate, and they are redeemed for real currency at that same exchange rate.

Because of this limitation, it is difficult to distinguish among or otherwise enable different types of credits in conventional systems. For example, seeding credits to a user may involve creating credits without an initial cost or with a discounted cost. Then, when the seeded credits are transferred or redeemed, the seeded credits may need to be identified and/or their original cost tracked. Otherwise, the virtual currency system may not be able to distinguish the seeded credits from other credits in the currency system. Identifying the seeded credits may be necessary, for example, for providing the correct value upon redemption of the virtual credits or for other accounting requirements.

Discounting of goods or services in the virtual currency system may also involve creating credits that have different exchange rates for real currency. For instance, a vendor may desire to identify and accept virtual credits that have a real currency value (i.e., a redeemable value) that is lower than the actual value of the good or service in order to provide a discount to a user. But existing virtual currency systems, which are not able to create and track virtual credits having different characteristics, do not enable such discounting schemes.

These inherent limitations of existing virtual economies stem, at least in part, from their inflexible relationship with real currencies, such as how virtual credits may be exchanged for real currency. Moreover, existing virtual currency systems fail to provide adequate accounting mechanisms that enables higher level features in a virtual economy. Accordingly, there is a need for improved ways of creating, tracking, and redeeming virtual credits in a virtual currency system.

SUMMARY

To enhance the capabilities of a virtual economy, embodiments of the invention provide a virtual currency system that manages units of a virtual currency, called virtual credits. The virtual credits may be owned by and exchanged among various participants in the virtual economy. The participants in the virtual economy may include individual users, vendors or other non-individual entities, such as third party payors, and even the central manager of the virtual currency system. Moreover, the virtual credits may be purchased and/or sold in exchange for real currency. The purchase of new virtual credits may involve the creation of new virtual credits by the virtual currency system, and the sale of existing credits may involve the redemption of existing virtual credits by the virtual currency system.

In one embodiment, a virtual currency system keeps track of information about the virtual credits. For example, each virtual credit may have an internal value and an external value, and these values may be different for different virtual credits (or buckets of virtual credits). The internal and external values for each virtual credit define, respectively, the exchange rates for creating and redeeming the virtual credits. Upon creation of new virtual credits, the internal value for those virtual credits is the rate for which real currency was paid per virtual credit, which may be different from an apparent face value of the virtual credit. The external value of the virtual credits may also be established at creation, where the external value sets the rate at which the virtual credits can be redeemed for real currency. Each virtual credit may further have a face value, which is an apparent value of the virtual credit within the virtual economy, giving users a baseline impression for valuing the virtual currency. The face value thus allows the virtual currency to be expressed in terms of a real-currency monetary value (e.g., 100 virtual credits may have a face value of $10).

As virtual credits are transferred within the virtual economy, from participant to participant, the virtual currency system tracks these values for the virtual credits. The ability of the face, internal, and external values to be different, and the tracking of these values for the virtual credits owned by each participant, enables a number of useful actions within the virtual economy, including currency seeding, couponing, and chargebacks.

Figure 1:
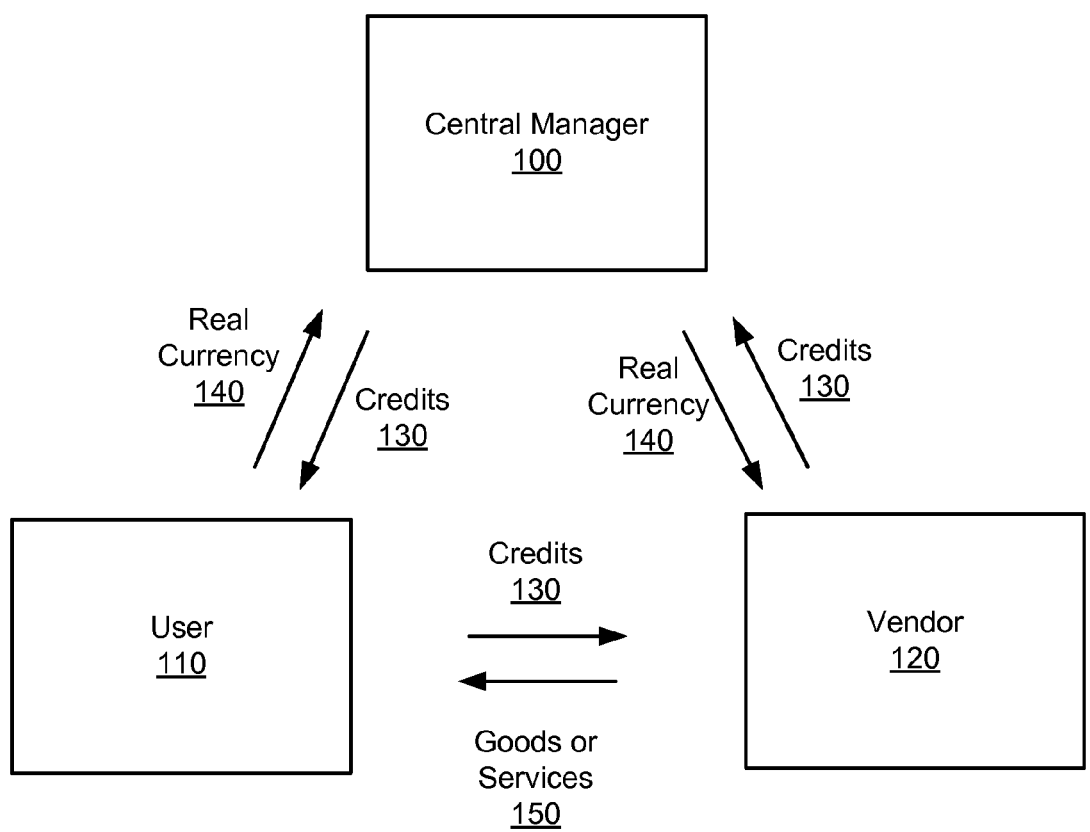
FIG. 1 is a high-level conceptual diagram illustrating the virtual currency system where credits are created, transferred, and redeemed, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A virtual currency system offers participants a means to exchange goods and services in a virtual online environment.

Participants exchange virtual credits to purchase goods, services, or other items of value. A virtual currency system can provide access to goods and services for a wider audience of users than a traditional currency system by providing new and easier methods to purchase or acquire goods and services. As used herein, the term "credit", or "virtual credit," refers to a unit of virtual currency used in the virtual currency system. "Virtual currency" refers to currency that is exchanged for value in a virtual environment. In contrast, "real currency" refers to any type of currency used in transactions of value outside of a virtual environment. Real currency can also include intangible currency, such as mobile phone minutes, airtime credits or other units of value used in a wireless services account. The virtual currency system can exist in any virtual environment where users can interact and exchange value, such as an online game website, an online simulation environment, a social networking environment, or an online marketplace. The goods or services that are exchanged in the virtual currency system may be real, virtual, digital, or a combination thereof.

In the virtual currency system, a bucket of virtual credits is created with an internal value, an external value, and a face value. A bucket of credits may include one or more credits. The internal value is set by the original rate for creating the credits. The external value is set by the rate of exchange of the credits for real currency. The face value is the value of the virtual currency that is shown to the users of the system.

Creating credits with an internal value and an external value allows for various applications. The internal value of the bucket of credits can be determined to allow for currency applications such as discounting or seeding. An internal value that is lower than the actual cost of creating a bucket of credits allows the user to receive a discount for the cost of purchasing the credits. An internal value of zero enables seeding of credits to a user at no initial cost. Moreover, discounting of the external value lowers the redemption value of the credits. An external value that is lower than the cost of a good or a service allows the vendor to give a discount to the user for the good or service. The internal and external values can be used as identifying attributes for a bucket of credits and enable tracking of the credits through various transactions in the virtual currency system.

Participants of the virtual currency system can include users, vendors, a central manager, and third party payors. Users are individuals that acquire or purchase credits and exchange the credits for goods or services. Another type of participant is a vendor, which can be individual, business, developer, or entity that provides services or goods in exchange for credits. The central manager manages the creation, transfer, and redemption of credits and interacts with the participants. The central manager can be an individual, group, entity, business or social network provider. In some embodiments, the central manager can also act as a user or vendor. The central manager can provide goods and services in exchange for credits from users. Other participants can include non-individual entities or third party payors, such as electronic payment providers or mobile phone carriers, which facilitate or participate in transactions in the virtual currency system. Various other participants may be included in the virtual currency system.

FIG. 1 shows a high-level block diagram of an embodiment of the virtual currency system. In one embodiment, the central manager 100 interacts with users 110 and vendors 120. The central manager 100 issues credits 130 in exchange for real currency 140. The user 110 can purchase credits 130 from the central manager 100 in exchange for real currency 140. The user 110 can exchange credits 130 for goods or services 150 from a vendor 120. The vendor 120 can accept credits 130 from users 110 in exchange for goods or services 150 and redeem the credits 130 for real currency 140 from the central manager 100.

Various other transactions can occur among the participants of the virtual currency system. In some embodiments, the central manager 100 also acts as a vendor 120 and provides goods and services 150 to users 110 in exchange for credits 130. The central manager 100 can sell credits 130 to users 110 and vendors 120. Moreover, the central manager 100 can sell both credits 130 and goods and services 150 to users 110. For example, the central manager 100 can sell a bucket of fifty credits to a user 110 for ten dollars, and then sell an online game application to the user 110 in exchange for the same credits 130.

In other embodiments, the vendor 120 can sell credits 130 to the user 110 in exchange for real currency 140. In one embodiment, vendors 120 can redeem credits 130 for real currency 140, but users cannot redeem credits 130 for real currency 140. The vendor 120 can also purchase credits 130 from the central manager 100.

In another embodiment, a third party payor, such as an electronic payment provider, mobile phone carrier, or mobile virtual network operator, can assist in transactions within the virtual currency system. In some aspects, the third party payor can purchase credits 130 from the central manager 100 on behalf of the user 110. The third party payor can also charge a fee for the transaction. For example, a user 110 can purchase credits 130 via a mobile phone carrier. The user 110 has an account with the mobile phone carrier and can request to trade minutes for the purchase of credits 130. The mobile phone carrier can subtract a certain number minutes from the user's account for the value of the credits 130 and include a surcharge for the transaction. In another embodiment, the mobile phone carrier can charge the user's account directly for the purchase of the credits 130. The mobile phone carrier can purchase credits 130 from the central manager 100, and the central manager can provide the credits 130 directly to the user. In other embodiments, the mobile phone carrier can receive credits 130 from the central manager 100 and provide the credits 130 to the user 110. The user 110 can also request that the mobile phone carrier purchase services or goods 150 from a vendor 120 on behalf of the user 110. For example, a user 110 can request that the mobile phone carrier purchase an online game application from a vendor 120 on behalf of the user 110.

System Architecture

Figure 2:
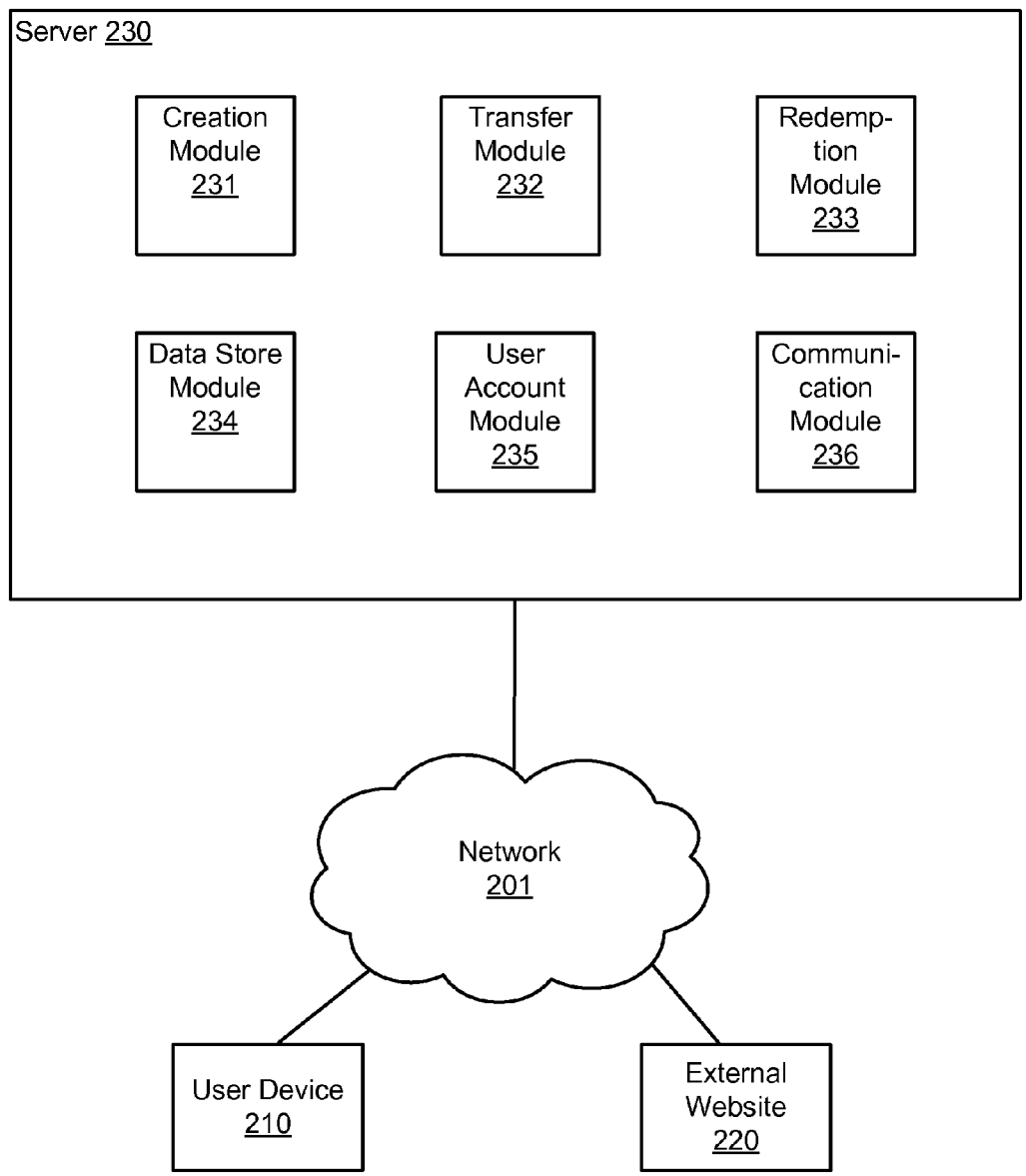
FIG. 2 is a network diagram of a system environment for creating, transferring and redeeming credits, in accordance with an embodiment of the invention.

FIG. 2 is a high level block diagram illustrating a virtual currency system environment 200 suitable for the creation, redemption and accounting of virtual currency. The system environment may comprise one or more user devices 210, one or more external websites 220, a server 230, and a network 201. The user devices 210 comprise one or more computing devices that can receive user input and can transmit and receive data via the network. For instance, the user devices 210 can be desktop computers, laptop computers, portable computers, smart phones, personal digital assistants (PDAs) or any other device including computing functionality and data communication capabilities. The user devices 210 are configured to communicate via the network 201, which may comprise any combination of local area and/or wide area networks, using both wired and wireless communication systems.

In some embodiments, the virtual currency server 230 is accessed through a website 220. In other embodiments, the virtual currency server 230 is accessed through a social networking website.

The network 201 is connected to a server 230, which comprises a creation module 231, a transfer module 232, a redemption module 233, a data store module 234, a user account module 235, and a communication module 236. In other embodiments, the server 230 may include fewer, additional or different modules for various applications.

The creation module 231 creates new credits with identifying values and attributes. An embodiment of the creation process is described in detail in FIG. 3. In one embodiment, the creation module 231 creates buckets of credits and determines attributes associated with the bucket of credits, which may include one or more of the following: the number of credits in the bucket, an internal value, an external value, a face value, a unique identification ("ID") number, and a time stamp. Other identifying attributes may be created for the bucket of credits.

The data store module 234 inputs and stores attributes about the bucket of credits in a database. In some embodiments, the data store module 234 records information about the ID number associated with the bucket of credits, the number of credits in the bucket, the internal value, the external value, and a time stamp for the bucket of credits. The data store module 234 can record data about the transaction history for a bucket of credits or a portion of the credits.

Figure 4:
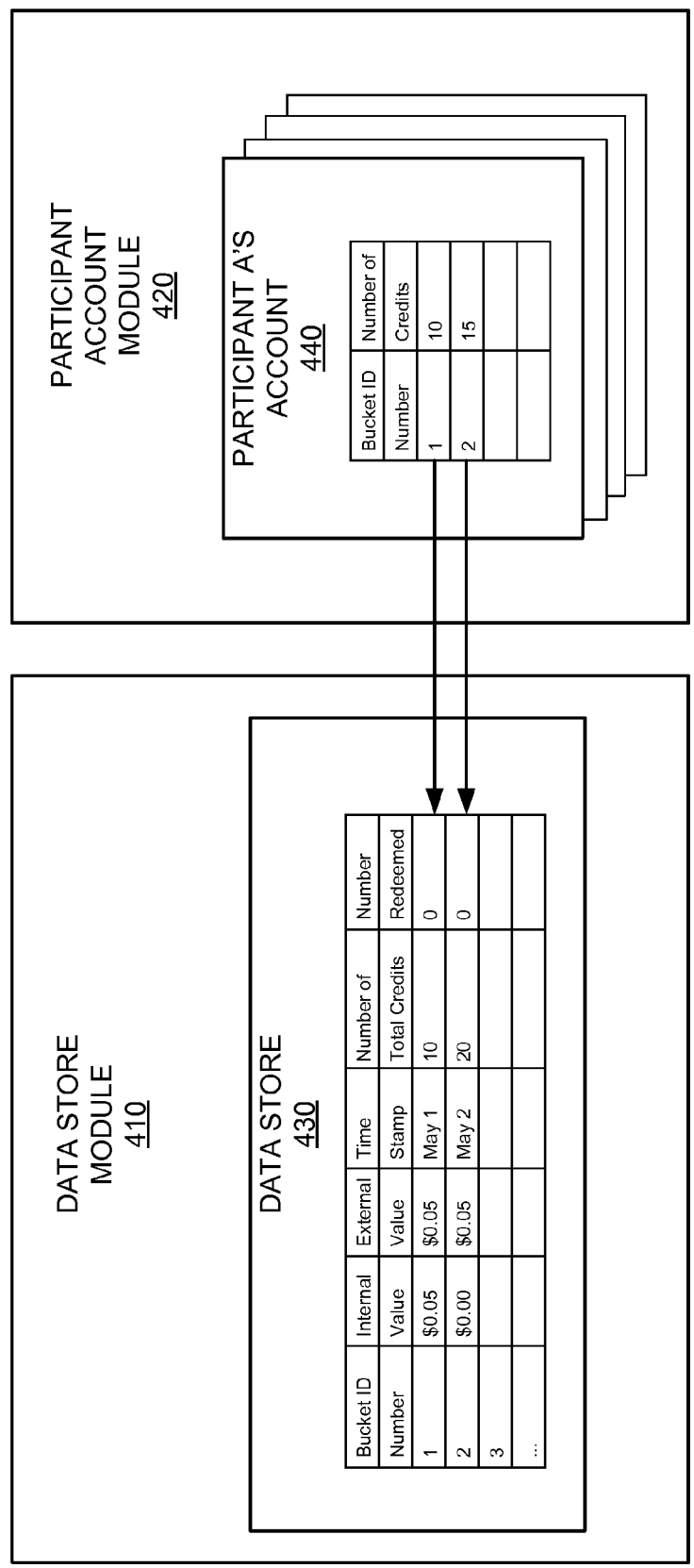
FIG. 4 is a diagram of the participant account module and the data store module of the virtual currency system, in accordance with an embodiment of the invention.

The participant account module 235 stores information about the accounts of the participants in the virtual currency system. In some embodiments, each participant has an account with a record of the credits owned by the participant. The participant account module 235 stores information about the number of credits in the participant's account and the ID number associated with each bucket of credits. The details about the data store process are shown in FIG. 4.

The transfer module 232 transfers credits among participants' accounts in the virtual currency system. The transfer module 232 can transfer credits from a transferring participant to a receiving participant. For example, the transfer module 232 can transfer credits from the central manager 100 to a user 110, from a first user 110 to a second user 110, or from a vendor 120 to a user 110. The transfer process is described in detail in FIG. 5.

The communication module 236 enables communication between the various modules and the network. The communication module enables connectivity within the environment of the virtual accounting system. If the virtual currency system is accessed via a website, the communication module is a web server.

Creation of Virtual Credits

Figure 3:
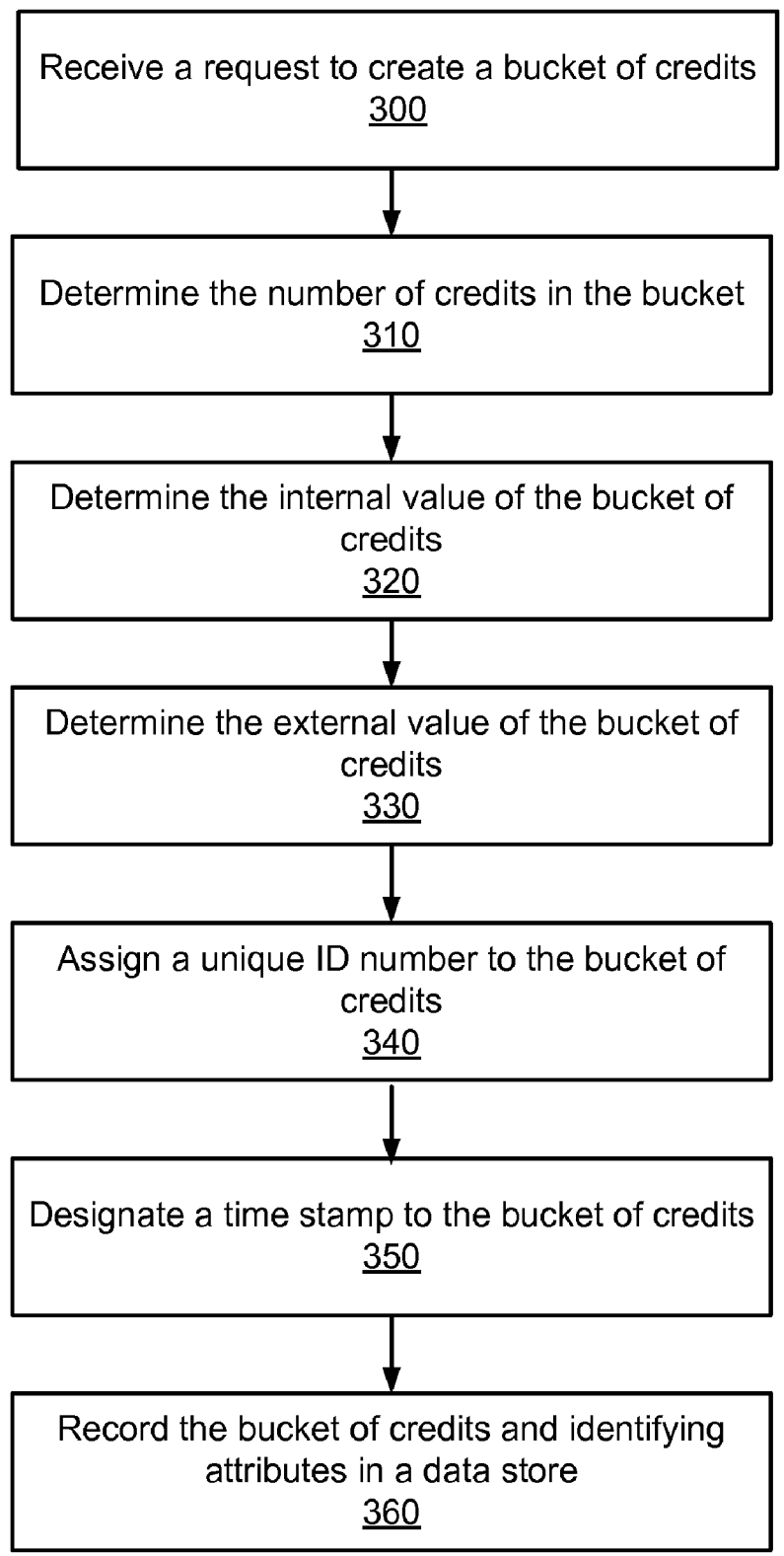
FIG. 3 is a flowchart depicting a process for creating credits in a virtual currency system, in accordance with an embodiment of the invention.

FIG. 3 shows the detailed steps for the creation of a bucket of credits in the virtual currency system. The creation of virtual credits begins when the creation module 231 receives a request to create a new bucket of credits 300. The request may be accompanied with an amount of real currency required to create a bucket of new credits. In some embodiments, no amount of real currency is required to create a bucket of new credits. The creation module 231 may receive a plurality of requests to create new buckets of credits.

The creation module 231 also determines the number of credits that will be created for a new bucket 310. For each bucket of credits, the creation module 231 determines attributes to assign to the bucket of credits. For instance, the creation module determines the internal value of the bucket of credits 320. The internal value is based on the initial exchange rate for creating the credits. For example, if the initial cost to create a bucket of 100 credits is $10.00, the internal value would be $0.10. Each credit in a bucket is assigned the same internal value. In some embodiments, the internal value of the bucket of credits is hidden from the users of the system.

The creation module 231 also determines an external value for the bucket of credits 330. The external value is a rate at which the credit is exchanged for real world currency. The external value is attributed to each credit in the bucket. For instance, for a bucket of 100 credits, each of the credits in the bucket has an external value of $0.05. The external value of $0.05 is used to calculate the value of the 100 credits at the time of redemption of the credits, which would result in $5.00 of real currency. Each credit in the bucket has the same external value. In some embodiments, the external value of the bucket of credits may be hidden from the user or vendor.

Every credit in the virtual currency system is given a fixed face value. The face value can be the same for all credits in the system. The face value is the apparent value of the credit that is presented to participants in the system. For example, the credit may have a face value of 10 virtual currency units, but have an internal value of $0.01 and an external value of $0.05. In some embodiments, the face value may correspond with the internal value or the external value of the credit. In other embodiments, the face value can be independent of the internal value and the external value of the credit. In another embodiment, the face value is given a real currency value. For instance, a credit may be presented as having a face value of $0.10.

The creation module 231 assigns a unique identification number ("ID number") to the bucket of credits 340. Each credit in a bucket carries the same ID number, and different amounts of credits from the same bucket can be tracked through various transactions based on the ID number. The creation module 231 can assign a time stamp to the bucket of credits 350, which may include details about the time and/or date when the bucket of credits was created. The creation module 231 may associate one or more additional attributes to the bucket of credits. The creation module 231 associates the bucket of credits with all of the attributes.

The creation process continues with the data storage module 234, which inputs a record about the bucket of credits and its associated attributes into a data store 360. The data store module 234 can update the data store for a plurality of buckets of credits by recording data about each new bucket and the corresponding identifying attributes.

FIG. 4 shows one embodiment of the data store module 410 and the participant account module 420. The data store module 410 inputs and stores information into a data store 430 about the various attributes associated with the bucket of credits. In some embodiments, the data store module 410 records the ID number associated with the bucket of credits, the number of credits in the bucket, the internal value, the external value, and a time stamp for the bucket of credits. The data store module 410 can record the number of credits that were redeemed from the bucket and/or the number of remaining credits in the bucket after one or more of the credits are redeemed. The data store module 410 may input fewer or additional attributes about the bucket of credits. The data store module 410 can store attributes about every bucket of credits in the virtual currency system.

In one embodiment, the data store module 410 stores the information about the bucket of credits according to the ID number. In some embodiments, the data store module 410 records the buckets of credits in a database in the chronological order in which they are created. In other embodiments, the data store module 410 records and organizes the buckets of credits according to the internal value or the external value of the credits.

Next, the data store module 410 assigns a number of credits to one or more accounts of participants. A bucket of credits may be assigned to one participant or apportioned to numerous participants. When a bucket of credits is assigned to a participant, the attributes of the bucket are maintained with the bucket of credits in the participant's account.

The participant account module 420 makes a record of the credits that are assigned to one or more participants. FIG. 4 illustrates that a bucket of credits or a portion of the bucket of credits can be assigned to a participant's account 440. The participant account module 420 records data about the credits in each participant's account 440 according to the data in the data store. For instance, the participant account module 420 can record data about the number of credits and the ID number of the credits in the participant's account 440. In some embodiments, the participant account module 420 includes a database of all the accounts 440 in the virtual currency system. In one embodiment, a participant's account 440 comprises a table with entries of credits and the information about each entry, including the bucket ID number for the bucket from which the credits in the entry originated. In some embodiments, the participant's credits are listed chronologically in the participant's account 440 according to the order in which the participant acquired or purchased the credits. In other embodiments, the participant account module 420 lists the credits in a table based on other attributes of the bucket, such as the number of credits, ID number, internal value or external value of the credits.

In another embodiment, the creation module 231 can create classes of credits. A class of created credits can be defined by one or more attributes, such as the external value, internal value, or another identifying attribute described herein. The number of created credits in a class can increase as more credits with the same defining attributes are created. The class of credits is not limited by the time at which the credits were created or the number of credits that were initially created in the class. For instance, a class of created credits can be defined by an internal value, such as an internal value of $0.05 per credit. The class of created credits can expand in number each time more credits are created with an internal value of $0.05. The creation module 231 can create numerous classes of credits categorized by any identifying attribute(s). The data store module 234 can record the data about the class of credits and input the number of credits in the class as credits are created and redeemed.

Transfer of Credits

The transfer module 232 can transfer a newly created bucket of credits into a participant's account. The transfer module 232 begins a transfer of credits when it receives a request to transfer credits from one participant's account (e.g., the transferring participant) into another participant's account (e.g., the receiving participant). When a transfer of credits occurs, the transfer module 232 updates both the account of the transferring party and the account of the receiving party. In some embodiments, the transfer module 232 receives information about the number of credits to be transferred from a transferring party's account and the bucket ID number associated with the credits. The transfer module 232 updates the transferring party's account by reducing or deducting the number of credits in the account by the number of credits that are to be transferred to the receiving party's account. An entire entry for a bucket of credits can be removed from a transferring party's account if the transfer request depletes all of the credits in the bucket. Next, the transfer module 232 can update the receiving party's account by adding the number of credits that were transferred into the account, which includes associating the attributes about the bucket of credits with the account of the receiving participant. For instance, the bucket ID number is associated with the transferred credits in FIG. 4. Accordingly, the transfer module 232 can transfer credits among participants' accounts while maintaining data about the attributes associated with the transferred credits.

The order in which the credits are transferred can be varied in the virtual currency system. In some embodiments, the credits are transferred according to the chronological order in which the participant acquired or purchased the credits. In a first-in-first-out ("FIFO") method, the credits that were acquired or purchased first are the first to be transferred out.

Figure 5:
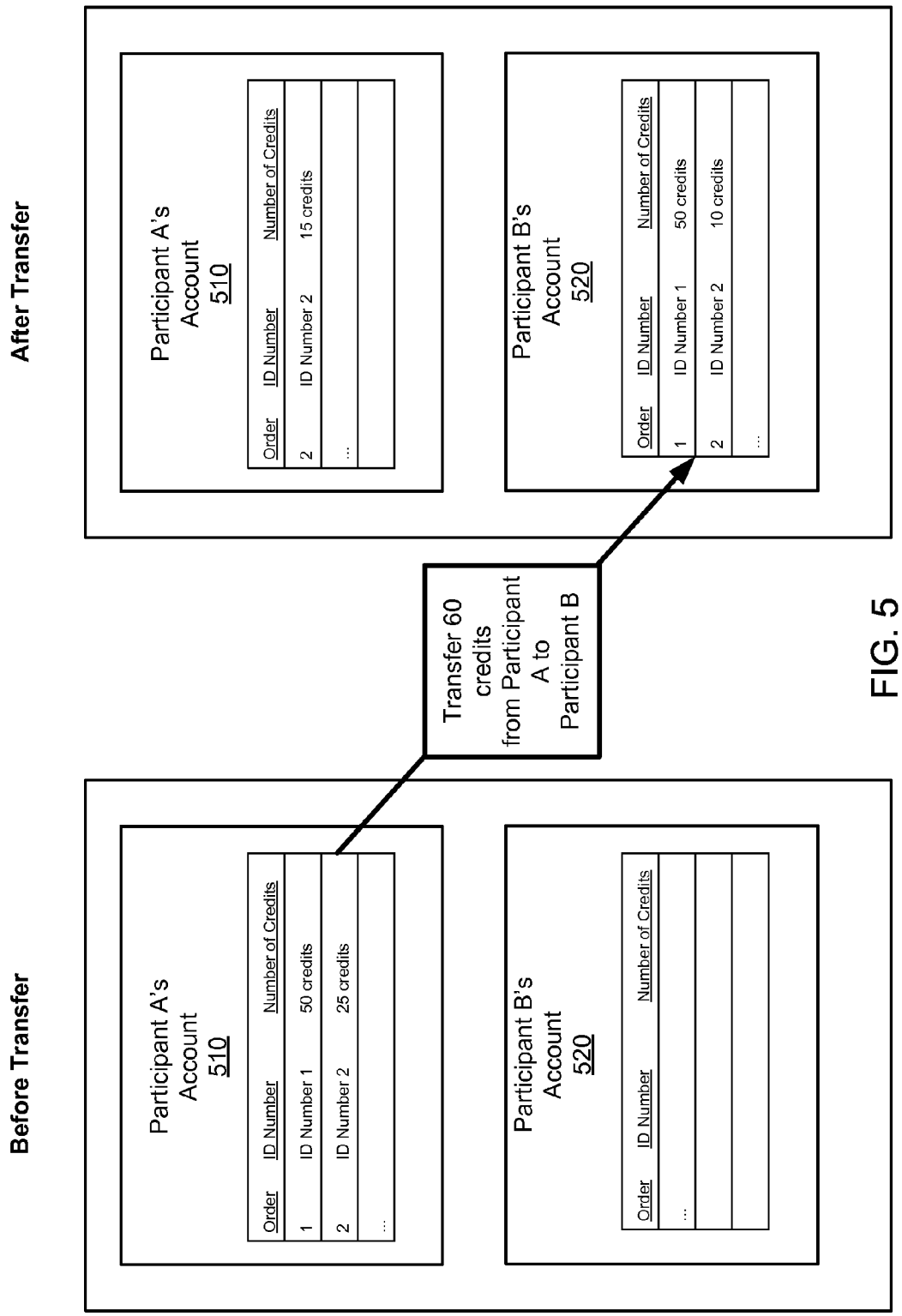
FIG. 5 is a diagram illustrating a transfer of credits between participants' accounts, in accordance with an embodiment of the invention.

FIG. 5 shows one embodiment of a transfer of credits using the FIFO method between the account of Participant A 510 and the account of Participant B 520. Participant A can make a request to transfer 60 credits from Participant A's account 510 to Participant B's account 520. Prior to the transfer, Participant A's account 510 shows a list of entries that represent credits that Participant A owns and the order in which Participant A acquired the credits. The order of the credits in Participant A's account 510 shows that Participant A first acquired 50 credits with an ID Number 1 and then acquired 25 credits with an ID Number 2. Participant B's account 520 has no credits prior to the transfer. The transfer module 232 can transfer the credits that were acquired the earliest (ID Number 1) based on the chronological list of credits in Participant A's account 510. If the first bucket of credits does not fulfill the transfer request, the next bucket of credits (ID Number 2) is used to fulfill the request to transfer credits to Participant B's Account 520. For example, in order to transfer 60 credits from Participant A to Participant B, the transfer module 232 first updates Participant A's account 510 by removing 50 credits of ID Number 1. This depletes all of the credits with ID Number 1 in Participant A's account 510, and the entry for ID Number 1 is deleted from Participant A's account 510. Next, the transfer module 232 removes 10 credits of ID Number 2 from Participant A's account 510. The transfer module 232 updates Participant B's account 520 by adding entries for 50 credits of ID Number 1 and 10 credits of ID Number 2. After the transfer, 15 credits of ID Number 2 remain in Participant A's account 510.

In some embodiments, the data store module 234 can record the information about each transfer that is carried out by the transfer module 232. In one embodiment, the data store module 234 can record the number of credits that are transferred, the bucket ID number, and the account of the participant to which the credits are transferred for each transaction. The data store module 234 can store the entire transaction history for a bucket of credits as the credits are exchanged and apportioned in various transactions in the virtual currency system.

In another embodiment, the credits in the participant's account with the lowest internal value are transferred before other credits with a higher internal value. In some embodiments, the credits with the lowest external value are selected for transfer before other credits with a higher external value. In other embodiments, the credits with the highest external value are selected for transfer before other credits in the participant's account. In a related embodiment, the external values of all of the credits held in the participant's account are averaged, and the credits are transferred equally without consideration of when the credit was obtained or the external value or internal value of the credits.

Redemption of Credits

Figure 6:
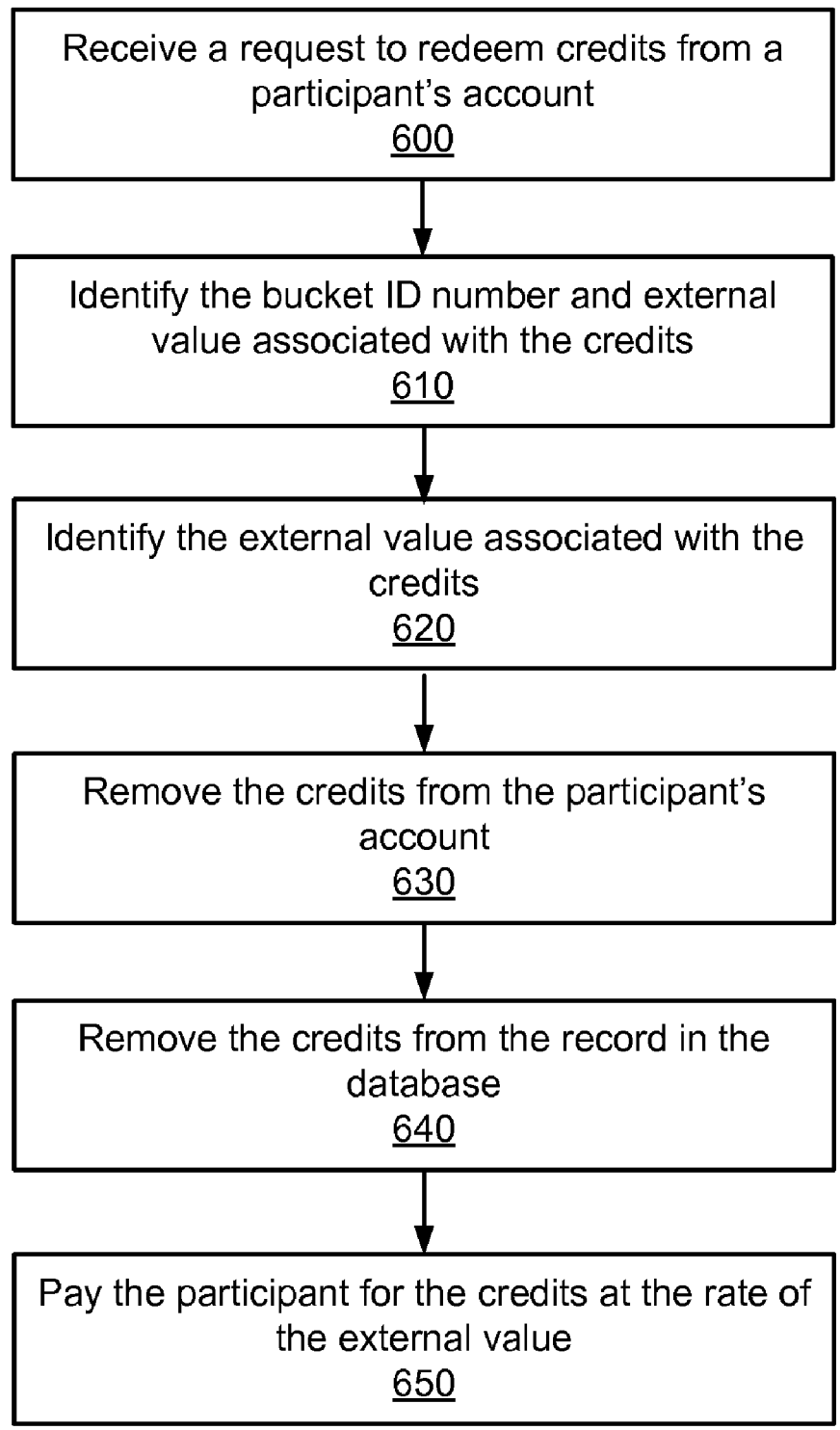
FIG. 6 is a flowchart of the redemption process, in accordance with an embodiment of the invention.

FIG. 6 illustrates one embodiment of the redemption process. The redemption module 233 can execute the redemption of virtual credits into real currency. The redemption module 233 receives a request for credits to be redeemed 600 from a participant's account. The redemption module 233 identifies the credits to be redeemed in the participant's account according to the bucket ID number(s) 610. Next, the external value(s) associated with the credits must be identified 620. The request can also include information about the number of credits to be redeemed. The redemption module 233 removes the credits from the participant's account 630 and removes the record about the credits from the database 640. The redemption module 233 pays the user in real currency for the value of the credits based on the external value associated with the credits 650. The exchange rate between the redeemed credits and the real currency paid for them is set by the external value of the credits that are being redeemed. For instance, a vendor may request to exchange a bucket of 100 credits for real currency from the central manager. The credits may have an external value of $0.05, so the vendor would receive $5.00 of real currency upon redemption of the bucket of credits.

In another embodiment, the data store module 234 can remove the record in the database to indicate that the credits have been redeemed from the system. The participant account module 233 can also update the record in the participant's account to remove the credits that have been redeemed.

In some embodiments, only certain types of participants, such as vendors or third party payors, can redeem credits for real currency. In one embodiment, individual users may purchase credits and exchange credits for goods and services within the virtual currency system, but may not redeem the credits for real currency. The central manager receives the request to redeem the credits from the vendor or third party payor and manages the payment of real currency.

In one embodiment, the credits with the lowest internal value in the participant's account may be redeemed before other credits with a higher internal value. In some embodiments, the credits with the lowest external value are redeemed before other credits with a higher external value. In another embodiment, the external values of all of the credits held in the participant's account are averaged, and the credits are redeemed equally without consideration of the external value of the credits.

In some embodiments, a participant can be charged a tax when credits are redeemed for real currency. For example, a sales tax can be applied to the payment of real currency at the time of redemption. In other embodiments, a tax is applied for each transfer of credits within the virtual currency system.

Figure 7:
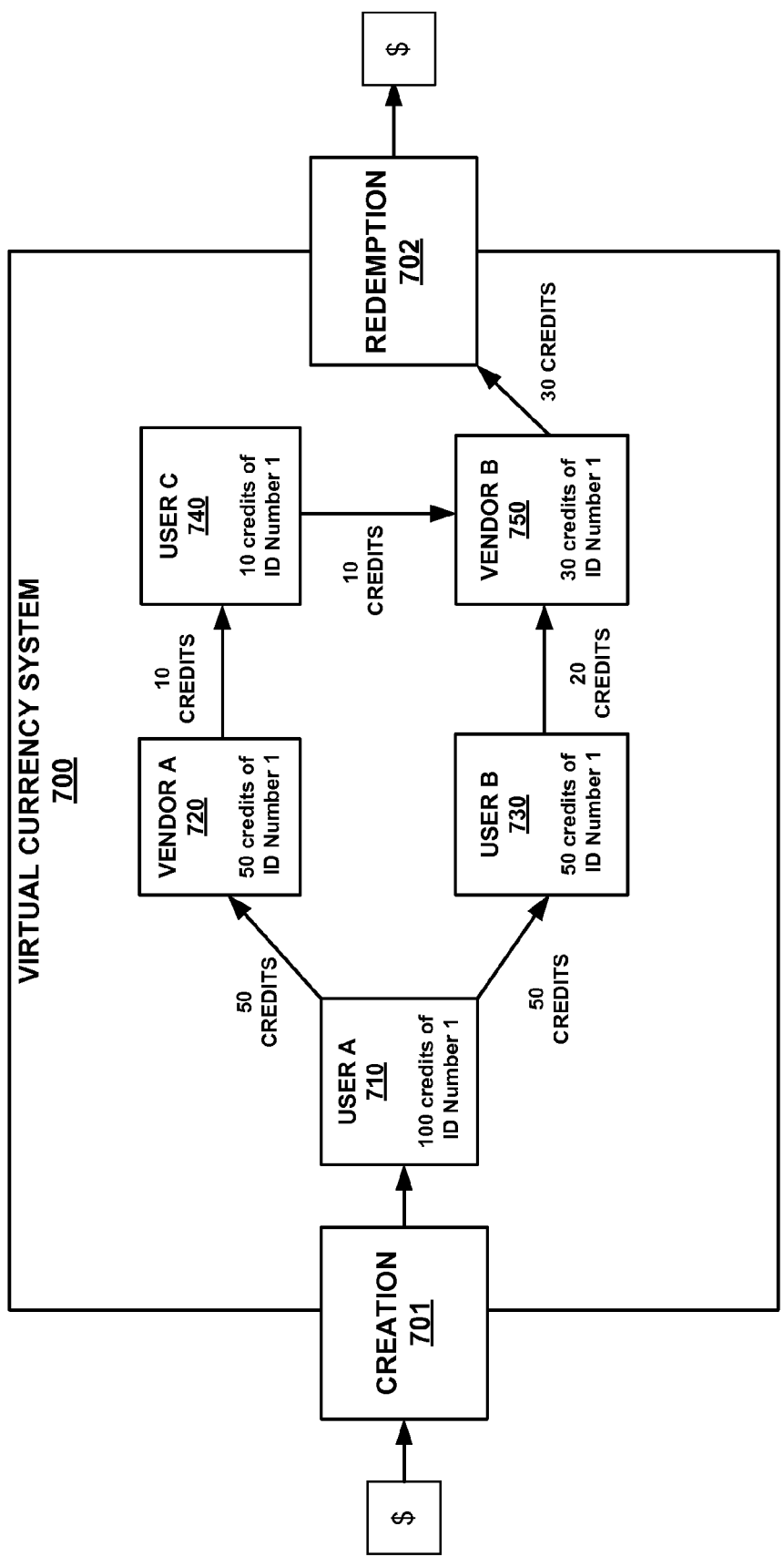
FIG. 7 is a diagram of the creation, transfer, and redemption of credits among participants of the virtual currency system, in accordance with an embodiment of the invention.

FIG. 7 illustrates an embodiment of the process of creating credits, transferring and tracking credits through various transactions based on the ID number associated with the credits, and redeeming credits for real currency. In some embodiments, the creation of credits 701 requires the input of real currency. The credits are then assigned to one or more users. In FIG. 7, User A 710 is assigned 100 credits with ID Number 1. The credits can be tracked through various accounts and exchanges based on the ID number, even though the credits are apportioned into smaller portions or individual credits. For example, User A 710 transfers 50 credits with ID Number 1 to Vendor A 720 and 50 credits with ID Number 1 to User B 730. Next, Vendor A 720 transfers 10 of the credits with ID number 1 to User C 740. User B 730 then transfers 20 credits with ID number 1 to Vendor B 750. Multiple transfers of credits with ID number 1 can occur in this manner among various participants within the virtual currency system. The transfer module 232 can carry out each transfer of credits, and the data store module 234 can record the transaction history for the bucket of credits as the credits are transferred among various participants' accounts. Finally, Vendor B 750 redeems all of its credits 702 in exchange for real currency. The central manager can manage the creation 701 and redemption 702 of credits. Various other types of transfers among multiple participants may occur in accordance with embodiments of the inventions.

EXAMPLES

Seeding of Credits

Credits with unique internal values and external values allow for seeding in the virtual currency system. A class or bucket of credits can be created with an internal value of zero and can be used to seed credits to users. Seeding occurs when credits are given to users without cost to the user. For instance, seeding new credits to a user can encourage a user to use a new online game or application. The user can try the online game or application at no cost by using the seeded credits. In some embodiments, the central manager can seed credits to users and track the transfers of the credits through the virtual currency system. The tracking of the seeded credits can help the central manager to see where and how seeded credits are spent. It can also enable the central manager to target offers to users who have seeded credits in their accounts.

In some embodiments, the central manager can subsidize the cost of seeding credits to users. For example, the central manager can create a bucket of 100 credits with an internal value of $0.00 and an external value of $0.05 and present the credits to a user. The vendor may provide $5.00 of services in exchange for the seeded credits from the user, and the vendor may redeem the bucket of credits for a real currency value of $5. The central manager subsidizes the cost of creating the credits and pays $5.00 when the credits are redeemed.

Seeding can also require a vendor to subsidize the costs of creating the credits. For example, a bucket of 100 credits may be created with an internal value of $0.00 and an external value of $0.05. The credits can be seeded to a user with an invitation to spend the credits with an online game vendor. The online game vendor may provide $10.00 worth of services in exchange for the 100 credits. When the vendor redeems the 100 credits, the vendor will only receive $5.00 in real currency based on the external value of $0.05. In this exchange, the vendor will subsidize $5.00 of the cost of seeding the user. In other embodiments, both the central manager and the vendor can subsidize the cost of seeding credits to users.

In a related embodiment, a user can earn credits in exchange for a preferred activity or behavior. A vendor can seed credits to users as a form of compensation for a user's participation or activity. For example, an online game developer can present an opportunity to a user to play its game or participate in a survey in exchange for a certain number of credits. Once the user has completed the activity or survey, the developer can seed credits to the user. The user may spend the seeded credits with the developer's application or other vendors in the currency system.

Discounting

Credits with unique internal values and external values can be used for discounting within the virtual currency system.

In some embodiments, discounting can occur when the credits are created. A user can purchase credits where the credits have an internal value that is less than the face value of the credits. For example, the actual cost of creating a bucket of 100 credits may be $10.00. A discount can be provided to the user by setting the internal value to $0.09, rather than the actual cost of $0.10. This allows the user to purchase the bucket of 100 credits at a discounted price of $9.00 based on the internal value of $0.09 per credit. When the user transfers the discounted credits to a vendor, the vendor receives less than full value for the credits. The user may only see the face value of the credits and not be aware about the discounted value at the time of purchase.

In other embodiments, discounting can occur when a vendor accepts a value as payment for a good or service that is less than the actual value of the good or service. For example, a bucket of 100 credits may have an external value of $0.09. A vendor may offer a service to a user that has an actual worth of $10.00 in real currency. The vendor may allow a discount for the service by accepting the bucket of 100 credits, and the vendor will receive $9 upon redemption of the bucket of 100 credits. This type of discounting requires the vendor to subsidize the cost of providing the good or service to the user.

In another embodiment, the cost of discounting goods and services to a user can be shared by the central manager and the vendor. For instance, the central manager can seed a bucket of 100 credits to a user with an internal value of $0.00 and an external value of $0.05. The user may exchange the bucket of credits for a good or service from a vendor that is actually worth $10.00. When the vendor redeems the bucket of credits from the central manager, the vendor receives $5.00 from the central manager based on the external value of $0.05. In this exchange, the central manager subsidizes the cost of creating the seeded credits ($5.00), and the vendor subsidizes the discounted cost of providing the good or service to the user ($5.00).

Various types of discounting can occur where the cost of discounting is shared by the vendor or central manager in the virtual currency system.

Redistribution

In other embodiments, the vendor can purchase credits from the central manager and redistribute the credits to users at a discount. For example, a vendor may purchase a bucket of 100 credits with an internal value of $0.05, and then sell the credits to users at a discount of $0.04 per credit. In some embodiments, the vendor may redistribute the credits to users at no charge (seeding). This practice keeps credits within the currency system and increases overall liquidity.

Viewing Accounts and Targeting Users

In some embodiments, an individual user's account balance and the type of credits in the user's account are visible to other participants, or to specific types of participants, such as vendors. The information about the type of credits in a user's account may include the external value or internal value, among other attributes of the credits. In one embodiment, an individual user may give another participant, such as a central manager or a vendor, permission to view the user's account.

In other embodiments, the central manager or vendor may target individual users who have a certain number of credits or credits with a certain internal value or external value. For instance, the central manager may want to target users with seeded credits in order to remove those credits from the virtual currency system or to encourage those users to spend the credits. In other embodiments, the central manager or vendor may target users with a large number of credits and invite those users to spend the credits. Users holding credits with a lower external value compared with other credits in the system may also be targeted for spending.

In another embodiment, the central manager or vendor may target a user based on the user's historical activity or transactions in the system. A user with a history of purchasing or spending a large number of credits may be offered a discount or an incentive to spend the credits with the central manager or a specific vendor. For instance, an online game developer (a type of vendor) may target a user who engages in extensive online gaming in order to attract the user as a customer. The developer may view multiple users' accounts and their past transactions in the virtual currency system to determine which user has engaged in gaming activity. In one embodiment, the developer can also determine the number of times the user has viewed the developer's products or services, or the number of times the user has viewed or purchased products and services of similar vendors. In another embodiment, the developer may present an offer to a user to purchase a bucket of credits for exclusive use with the developer's game. In some embodiments, the bucket of credits may be presented to the targeted user at a discounted price. The developer may also seed a bucket of credits to the user in order to attract the user to the game.

In a related embodiment, an individual user can be notified if the individual user has reduced his or her purchasing or spending activities. The notification may be sent via email, multi-media messaging service (MMS), text message, web page alert, or similar electronic or online communication medium. The central manager or a vendor may seed credits to the user to encourage the user to re-engage in spending activities. In another embodiment, the user can be notified if he or she does not have enough credits to spend with a certain vendor. The user can be notified about how many credits the user will need in order to purchase a specific product or service.

Refunds and Chargebacks

Credits with unique internal and external values also allow for the use of refunds and chargebacks in the virtual currency system. If a user purchases a bucket of credits and later decides to return the credits, the user can receive a refund in real currency based on the internal value of the bucket of credits. For instance, if a user pays $5.00 for the purchase of 100 credits and later decides to return those same 100 credits, the user can receive a refund of $5.00, based on the internal value of $0.05 associated with the credits. The central manager refunds the value of the credits to the user and removes the credits from the user's account. In some embodiments, the user requests the refund for credits and receives the refund via a third party payor or vendor. If a user requests a refund of the credits after spending them with a vendor, the vendor refunds the user the value of the credits, and the central manager removes the credits from the vendor's account. A vendor may be allowed to keep the user's credits in its account, for example, if the refund request is received within a certain amount of time after the user-vendor transaction (i.e., 90 days).

In other aspects, a transferring participant can transfer a certain number of credits to an account of a receiving participant. After the credits are transferred, the receiving participant may return the transferred credits to the transferring participant. The transferred credits can be identified by any of the attributes associated with the credits, such as the ID number, external value or internal value. The credits can be returned to the account of the transferring participant, and the receiving participant can receive a refund of the transferred credits. The transfer module 232 can carry out the return of the transferred credits, and the data store module 234 can record data about the refund transaction. The participant account module 235 can update records about the transferred credits in each of the participant's accounts.

Loans

In one embodiment, the credits in the virtual currency system can be used for loaning A participant (e.g., a transferring participant or loaning participant) may loan credits to another participant (e.g., a receiving participant or a borrowing participant) by transferring a certain number of credits to the receiving participant's account. In some embodiments, a loaning participant can view the contents of another participant's account before loaning credits to the participant. In other embodiments, the transferring participant can also track the transferred credits based on an associated attribute, such as the external value, internal value or bucket ID number. For instance, the central manager can loan a certain number of credits to a borrowing user and track the use of the credits based on the bucket ID number. The data about the loaned credits can be recorded in a data store. The data about the loaned credits (i.e., loan balance) can also be recorded and maintained in the account of the transferring participant and/ or the account of the receiving participant. In some embodiments, the receiving participant can later return the loaned credits back to the transferring participant or pay the loaning participant for the credits. When the loaned credits or the value of the loaned credits is returned, both of the participants' accounts and the data store can be updated to remove the record of the loan balance. In some embodiments, the loaning can occur among users of a social network environment.

Third Party Payors

In some embodiments, a third party payor can purchase credits on behalf of a user. The third party payor can be a mobile phone carrier, also known as a mobile network operator (MNO), carrier service provider (CSP), wireless services provider, or other wireless carrier. The third party payor can also be a mobile virtual network operator (MVNO) or similar entity. In some embodiments, the third party payor is an electronic payment provider or online payment service provider (PSP).

In one embodiment, a mobile phone carrier can purchase credits on behalf of a user and charge the user's account for the cost of the credits. The third party payor may charge an additional fee (e.g., surcharge) to the user for the purchase of the credits. The central manager can receive the real currency (minus the surcharge) from the third party payor and create a bucket of credits that have a discounted external value to account for the surcharge. The central manager can then provide the credits directly to the user.

In other embodiments, the user may exchange minutes in his or her mobile phone account for the purchase of credits. If the mobile phone carrier provides mobile phone credits to the user, the user may trade in his or her mobile phone credits to purchase virtual credits.

In another embodiment, the third party payor can sell credits to users on behalf of the central manager or vendor. In one embodiment, the third party payor can be awarded a bonus of real currency from the central manager for selling credits to users.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing an account for each of a plurality of participants of a virtual economy;
    receiving a plurality of requests to create new credits of the virtual currency;
    for each request to create new credits,
        recording, by processor, in a data store a number of credits created and a set of attributes of the credits, wherein the attributes include an internal value representing a rate of real currency received per credit created and an external value representing a rate of real currency to be provided per credit upon redemption,
        assigning the created credits to one or more accounts of participants, and
        associating the credits with their attributes;
    receiving a plurality of requests to transfer credits from an account of a transferring participant to an account of a receiving participant;
    for each request to transfer credits,
        deducting an amount of credits from the transferring participant,
        adding the amount of credits to the receiving participant, and
        associating the credits added to the receiving participant with their attributes;

receiving a plurality of requests to redeem a number of credits from the account of a participant;
for each request to redeem credits from the account of a participant,
deducting, by a processor, the redeemed credits from the account of the participant, and
providing an amount of real currency to the participant, the amount of real currency provided determined based on the external value of the redeemed credits.

2. The method of claim 1, wherein the attributes further comprise a face value, the face value representing the value presented to the participants in the system.

3. The method of claim 1, wherein the participant comprises a central manager.

4. The method of claim 1, wherein the participant comprises one or more individual users.

5. The method of claim 1, wherein the participant comprises one or more vendors.

6. The method of claim 1, wherein the participant comprises one or more third party payors.

7. The method of claim 2, wherein the internal value of the credits is less than the face value of the credits.

8. The method of claim 2, wherein the external value of the credits is less than the face value of the credits.

9. The method of claim 1, wherein the internal value of the credits is less than the external value of the credits.

10. The method of claim 1, wherein the external value of the credits is less than the internal value of the credits.

11. The method of claim 1, further comprising, for at least one of the requests to create new credits, receiving an amount of real currency in exchange for creating the credits, the received amount of real currency based on the internal value of the created credits.

12. The method of claim 1, further comprising, for each request to transfer credits, storing a record about the transfers of the credits in a data store.

13. The method of claim 1, wherein, for each request to transfer credits, deducting an amount of credits from the transferring participant comprises deducting the credits in the account in an order in which the credits were added to the account.

14. The method of claim 1, wherein, for each request to transfer credits, deducting an amount of credits from the transferring participant comprises deducting the credits in the account having a lower internal value compared with other credits in the account.

15. The method of claim 1, wherein, for each request to transfer credits, deducting an amount of credits from the transferring participant comprises deducting the credits in the account having a lower external value compared with other credits in the account.

16. The method of claim 1, further comprising receiving a request to transfer credits having an internal value of zero to the account of a receiving participant.

17. The method of claim 1, wherein receiving a request to transfer credits to a receiving participant is connected to a purchase of a good or a service by the transferring participant.

18. The method of claim 1, further comprising:
providing to a first participant an account balance of a second participant.

19. The method of claim 18, wherein the first participant is a vendor and the second participant is an individual user.

20. The method of claim 1, further comprising:
selecting an account of an individual user with one or more credits having an internal value of zero; and
inviting the individual user to purchase a good or a service in exchange for the credits.

21. The method of claim 1, further comprising:
selecting an account of an individual user with one or more credits having a lower external value compared with other credits in the system; and
inviting the individual user to purchase a good or a service in exchange for the credits.

22. The method of claim 1, wherein for one or more of the requests to transfer credits, the transfer comprises a loan of credits from a transferring participant to a receiving participant, the steps of carrying out a loan comprising:
storing a loan balance for the amount of loaned credits in a data store;
maintaining a loan balance in the accounts of the transferring participant and the receiving participant;
tracking the loaned credits through one or more transfers; and
updating the loan balance to reflect payment of the loan.

23. The method of claim 1, wherein a request to create new credits is received from a third party payor on behalf of an individual user.

24. The method of claim 23, wherein the third party payor charges a surcharge for the request to create new credits, and wherein the method further comprises discounting the external value of the new credits based on the surcharge.

25. The method of claim 23, wherein the third party payor is a mobile phone carrier that holds an account for the individual user.

26. The method of claim 1, further comprising:
receiving a request from an individual user to refund the created credits for real currency, the created credits associated with one of the requests to create credits;
retrieving the internal value associated with the created credits;
deducting the created credits from the account of the individual user; and
refunding the individual user for the value of the created credits in real currency based on the internal value of the credits.

27. The method of claim 1, further comprising:
receiving a request from a receiving participant to return the transferred credits back to the transferring participant, the transferred credits associated with one of the requests to transfer credits;
identifying the transferred credits;
deducting the transferred credits from the account of the receiving participant; and
adding the transferred credits back to the account of the transferring participant.

28. The method of claim 1, further comprising:
attributing to the created credits a unique identification number associated with a specific vendor;
assigning the created credits to an account of an individual user;
displaying to the individual user the total number of credits in the account of the individual user;
displaying to the individual user the number of created credits that have a unique identification number associated with the specific vendor; and
allowing the transfer of the created credits only to the specific vendor in exchange for a good or a service, the created credits having a redemption value based on the external value that is less than the value of the good or the service.

29. A method comprising:
storing an account for each of a plurality of participants of a virtual economy;

creating, by a processor, a bucket of credits comprising one or more credits, wherein the bucket of credits is associated with an internal value that represents a rate of real currency received per credit created and an external value that represents a rate of real currency to be provided per credit upon redemption;

assigning credits from the bucket of credits among one or more of the accounts, wherein the credits in each account are associated with the internal and external values;

transferring credits between the accounts of one or more participants;

tracking credits transferred between accounts, wherein the transferred credits retain their association with their internal and external values; and receiving at the processor a request to redeem one or more credits from an account, wherein the redeemed credits are deducted from the account, and wherein the participant associated with the account receives an amount of real currency according to the external value of the redeemed credits.

30. The method of claim 29, further comprising transferring credits having an internal value of zero to the account of a receiving participant.

31. The method of claim 29, further comprising:
selecting an account of a participant with one or more credits having an internal value of zero; and
inviting the participant to purchase a good or a service in exchange for the credits.

32. The method of claim 29, wherein transferring credits comprises a loan of credits from a transferring participant to a receiving participant, the steps of carrying out a loan comprising:
storing a loan balance for the amount of loaned credits in a data store;
maintaining a loan balance in the accounts of the transferring participant and the receiving participant;
tracking the loaned credits through one or more transfers; and
updating the loan balance to reflect payment of the loan.

33. The method of claim 29, further comprising:
receiving a request from a participant to refund the credits for real currency;
retrieving the internal value associated with the credits;
deducting the credits from the account of the participant; and
refunding the participant for the value of the credits in real currency based on the internal value of the credits.

34. The method of claim 29, further comprising:
receiving a request from a receiving participant to return the credits back to a transferring participant;
identifying the transferred credits;
deducting the transferred credits from the account of the receiving participant; and
adding the transferred credits back to the account of the transferring participant.

35. The method of claim 29, further comprising:
attributing to the credits a unique identification number associated with a specific vendor;
assigning the credits to an account of a participant;
displaying to the participant the total number of credits in the account of the participant;
displaying to the participant the number of credits that have a unique identification number associated with the specific vendor; and
allowing the transfer of the credits only to the specific vendor in exchange for a good or a service, the credits having a redemption value based on the external value that is less than the value of the good or the service.

* * * * *